US007968199B2

(12) United States Patent
Schlotterbeck et al.

(10) Patent No.: US 7,968,199 B2
(45) Date of Patent: Jun. 28, 2011

(54) METHOD FOR PRODUCING FILMS HAVING A COATING THE FILMS OBTAINED IN THIS WAY AND THEIR USE FOR PRODUCING MOLDED PARTS IN PARTICULAR FOR USE IN AUTOMOBILE CONSTRUCTION

(75) Inventors: Ulf Schlotterbeck, Manneheim (DE); Fatmir Raka, Munster (DE); Bernd Biallas, Albersloh (DE)

(73) Assignee: BASF Coatings AG, Munster (DE)

( * ) Notice: Subject to any disclaimer, the term of this patent is extended or adjusted under 35 U.S.C. 154(b) by 869 days.

(21) Appl. No.: 11/913,084

(22) PCT Filed: Apr. 24, 2006

(86) PCT No.: PCT/EP2006/003733
§ 371 (c)(1),
(2), (4) Date: Oct. 30, 2007

(87) PCT Pub. No.: WO2006/117091
PCT Pub. Date: Nov. 9, 2006

(65) Prior Publication Data
US 2008/0213600 A1   Sep. 4, 2008

(30) Foreign Application Priority Data

May 3, 2005   (DE) .......................... 10 2005 020 605

(51) Int. Cl.
*B32B 27/40* (2006.01)
*B05D 3/02* (2006.01)
(52) U.S. Cl. .................. 428/423.1; 427/385.5
(58) Field of Classification Search ............... 428/423.1; 427/385.5
See application file for complete search history.

(56) References Cited

U.S. PATENT DOCUMENTS

| 4,288,527 | A | 9/1981 | Morgan |
| 4,931,324 | A | 6/1990 | Ellison et al. |
| 4,939,213 | A | 7/1990 | Jacobs, III et al. |
| 5,030,514 | A | 7/1991 | Hartman |
| 5,084,541 | A | 1/1992 | Jacobs, III et al. |
| 5,401,348 | A * | 3/1995 | Oguchi et al. ............... 156/247 |
| 5,912,081 | A | 6/1999 | Negele et al. |
| 5,985,079 | A | 11/1999 | Ellison |
| 6,221,439 | B1 | 4/2001 | Negele et al. |
| 6,777,089 | B1 | 8/2004 | Koniger et al. |
| 6,932,882 | B2 * | 8/2005 | Haruta et al. ............... 156/306.3 |
| 2004/0208998 | A1 | 10/2004 | Steininger et al. |

FOREIGN PATENT DOCUMENTS

| DE | 2003579 A | 7/1970 |
| DE | 3316593 A1 | 11/1984 |
| DE | 3636183 A1 | 3/1988 |
| DE | 3836370 A1 | 5/1990 |
| DE | 19908018 A1 | 8/2000 |
| DE | 19914896 A1 | 10/2000 |
| DE | 10113273 A1 | 9/2002 |
| DE | 102004053245.1 A | 11/2004 |
| DE | 102004053247.8 A | 11/2004 |
| DE | 10335620 A1 | 3/2005 |
| EP | 0002866 B1 | 7/1981 |
| EP | 0054105 B1 | 12/1984 |
| EP | 0551409 B1 | 9/1994 |
| EP | 0819516 A | 1/1998 |
| EP | 0352298 B2 | 3/2001 |
| EP | 0624577 B1 | 9/2001 |
| EP | 0754740 B1 | 11/2001 |
| EP | 1047556 B1 | 7/2002 |
| EP | 0995667 B1 | 11/2002 |
| EP | 1144476 B1 | 12/2003 |
| WO | WO9937479 A1 | 7/1999 |
| WO | WO0039183 A1 | 7/2000 |
| WO | WO0051798 A1 | 9/2000 |
| WO | WO0063015 A | 10/2000 |
| WO | WO0200448 A2 | 1/2002 |
| WO | WO0216461 A1 | 2/2002 |
| WO | WO03016095 A1 | 2/2003 |
| WO | WO03018214 A | 3/2003 |

OTHER PUBLICATIONS

International Preliminary Report on Patentability for International Application No. PCT/EP2006/003733 dated Nov. 29, 2007.
International Search Report for PCT/EP2006/003733 dated Aug. 7, 2006.

* cited by examiner

*Primary Examiner* — Thao T. Tran
(74) *Attorney, Agent, or Firm* — Cantor Colburn LLP

(57) ABSTRACT

A process for producing sheets, in which a free-radically crosslinkable coating composition (K) which after crosslinking to completion gives a transparent coating (KE) is applied to a backing sheet (T), a coating (KT), dried but not yet crosslinked to completion, is produced from the coating composition (K), on (KT) a pigmented coating (PB) is produced and optionally on (PB) a tiecoat is applied, the crosslinkable coating composition (K) comprising a free-radically crosslinkable component (KK) based on urethane acrylate and containing carbamate and/or biuret and/or allophanate and/or urea and/or amide groups, (KK) having a number-average molecular weight of from 1000 to 50 000 g/mol, having a double bond content of from 1.0 to 5.0 mol of double bonds per 1000 g of reactive component (KK), containing on average per molecule >1 branching point, containing 5%-50% by weight, based in each case on the weight of component (KK), of cyclic structural elements, and containing at least one aliphatic structural element having at least 6 carbon atoms in the chain.

25 Claims, No Drawings

METHOD FOR PRODUCING FILMS HAVING A COATING THE FILMS OBTAINED IN THIS WAY AND THEIR USE FOR PRODUCING MOLDED PARTS IN PARTICULAR FOR USE IN AUTOMOBILE CONSTRUCTION

CROSS-REFERENCE TO RELATED APPLICATIONS

This Application is a National Phase Application of Patent Application PCT/EP2006/003733 filed 24 Apr. 2006, which claims priority to DE10 2005 020 605.0, filed 3 May 2005, both of which are hereby incorporated by reference.

FIELD OF THE INVENTION

The present invention relates to a process for producing sheets (F) bearing a coating (B), in which an optionally pretreated surface (T1) of a backing sheet (T) has applied to it
1. a crosslinkable coating composition (K) which comprises a free-radical crosslinkable component (KK) and which after crosslinking to completion gives a transparent coating (KE),
2. the coating composition (K) applied in stage 1 is dried and/or partially crosslinked, to give a coating (KT) as yet not crosslinked to completion,
3. a pigmented coating composition (P) is applied to the coating (KT) as yet not crosslinked to completion, and
4. a coating (PB) is produced from the coating composition (P) applied in stage 3,
5. a tiecoat (H) is optionally applied to the coating (PB) and if desired is dried,
the crosslinkable coating composition (K) comprising a free-radically crosslinkable component (KK) which
(i) comprises one or more oligo- and/or one or more polyurethane (meth)acrylates and
(ii) has a number-average molecular weight of from 1000 to 50 000 g/mol, preferably from 2000 to 6000 g/mol and more preferably from 2200 to 5000 g/mol, and
(iii) has a double bond content of from 1.0 to 5.0 mol of double bonds per 1000 g of reactive component (KK), preferably a double bond content of from 1.5 to 4.0 mol of double bonds per 1000 g of reactive component (KK) and more preferably of more than 2.0 to 3.5 mol of double bonds per 1000 g of reactive component (KK).

The present invention also relates to the sheets (F) that are obtainable by the process and bear a coating and to their use for producing moldings, especially for use in automobile construction.

PRIOR ART

Moldings comprising a polymeric material which has been provided with a sheet are known to the skilled worker. Possibilities here include laminating or adhering a sheet to plastic components, and also backing the sheets with the polymeric material directly in the shaping mold, by injection or compression molding or foaming (A. Grefenstein, "Folienhinterspritzen statt Lackieren, Neue Technik für Karosseriebauteile aus Kunststoff" [Injection backmolding of sheets instead of coating: New technology for plastic bodywork components] in Metalloberfläche, 10/99, vol. 53, Carl Hanser Verlag, Munich, 1999).

The multilayer color and/or effect sheets used for producing the moldings comprise, as is known, a backing sheet, at least one color and/or effect basecoat and a clearcoat. They correspond in their construction to the conventional multicoat color and/or effect paint systems.

Particularly in the field of automobile painting, however, a multiplicity of requirements are imposed on the appearance of the moldings' surfaces on the sheet side (cf., e.g., European patent EP 0 352 298 B1, page 15 line 42 to page 17 line 40).

The solutions proposed in the prior art, however, do not allow adequate meeting of these requirements, which are usual in the field of automobile painting. Moreover, some of the solutions proposed in the prior art are even contradictory in respect of the glass transition temperature that is to be set for the radiation-crosslinkable clearcoat materials used.

WO 03/018214, then, discloses a process of the kind specified at the outset for producing sheets which have been provided with a coating, and as its transparent coating composition it uses radiation-curable coating compositions, especially those based on polyurethane acrylates. Information on the amount of branching points in the polyurethane acrylates and of cyclic building blocks, allophanate groups, carbamate groups, urea groups, amide groups or biuret groups, or the like, however, is absent from the document.

The transparent coatings (KT) as yet not crosslinked to completion that are obtained in this process have handling properties in the uncured state that are in need of improvement. Even the completely crosslinked transparent coatings (KE) still have properties which are in need of improvement. For instance, the high film thicknesses of the transparent and pigmented coatings, which are necessary for the sheets, may result in problems, such as, in particular, popping in the course of drying.

EP-A-819 516, furthermore, discloses a process for producing moldings, in which a sheet that has been provided with a coating is inserted into a mold, the mold is closed and contacted with a polymeric material (KM) and the polymeric material (KM) is solidified, the process having the characteristic feature that the coating material is only partly crosslinked before the polymeric material is introduced, and is only crosslinked to completion during and/or after the introduction of the polymeric material (KM). Preference in the process is given to using radiation-crosslinkable coating compositions having a glass transition temperature of below 40° C., based in particular on urethanes. However, further information on the constitution of suitable coating compositions is absent.

EP-B-1 047 556 discloses a process for producing coated dry-paint films, it being essential that the pigmented coating has a greater breaking elongation than the transparent coating. WO 02/00448 and WO 00/51798, moreover, disclose processes for producing coated dry-paint films wherein the protective films that are disposed over the transparent coating are essential.

As transparent coating compositions for producing the sheets, these documents use, in particular, fluoropolymer-based coating compositions, whereas the use of radiation-curable coating compositions is not described. As a consequence, the sheets obtained by these processes likewise have unsatisfactory properties, in particular an inadequate scratch resistance. Moreover, the use of fluoropolymers is disadvantageous on environmental grounds.

WO 00/39183 discloses oligourethane acrylate-based coating compositions that are curable thermally and by means of radiation—so-called dual cure—and which are notable in particular for a combination of low viscosity and low solvent content on the part of the as yet uncured coating compositions. These coating compositions are also used for coating sheets. However, prior to further processing/thermo-forming and/or storage of the coated sheets, the transparent coating compositions must be precured, in particular by means of UV radiation, in order to ensure the requisite freedom in tack and mechanical load-bearing capacity of a coated sheet. Generally speaking, however, the precrosslinked transparent coatings obtained no longer have sufficient thermoformability.

Furthermore, WO 00/63015 discloses a process for producing moldings, where a pigmented coating composition (P) is applied to a thermoplastic backing sheet and atop said pigmented coating a transparent coating composition (K) is applied. The crosslinkable coating composition (K) employed is composed of a radiation-crosslinkable material which comprises a binder having a glass transition temperature of more than 40° C. The transparent coatings (KE), crosslinked to completion, that are obtained in this process have unsatisfactory properties, however. In particular the crosslinking of the transparent coating (KE) is inadequate.

Moreover, in the case of the process described in WO 00/63015, the thermoplastic polymers used as pigmented coating composition comprise dyes or pigments distributed in the polymer layer. This color layer is applied by extrusion, whereas the use of solventborne or aqueous, pigmented coating compositions and the techniques for applying them are not described.

Finally, unpublished patent application DE 102004053247.8-43 and also unpublished patent application DE 102004053245.1-43 disclose processes for producing moldings where first a pigmented coating composition (P) is applied to a backing sheet and then a transparent coating composition (K) is applied atop said pigmented coating. Processes for producing dry-paint films where first of all the transparent coating composition (K) is applied to a backing sheet (T) and dried before the pigmented coating composition (P) is then applied to the dry transparent coating (KT), however, are not described in these documents.

Problem

The problem to be addressed by the present invention was therefore to provide a process for producing sheets bearing a coating, in which adequate crosslinking of the coating compositions (K) is ensured, on the one hand. On the other hand, however, the coating (KT) as yet not crosslinked to completion must no longer flow in the course of further processing, in particular during the application of the pigmented coating compositions, must not stick to the apparatus or be marked by it. Moreover, the removability of the sheet (T) from the coating (KT) without incidence of marks on the coating (KT) must be ensured.

Furthermore, where the sheets are used for producing moldings, and particularly in the case where the moldings are used in the automobile industry, the moldings ought to satisfy, in terms of their appearance on the sheet side, the requirements for what is known as a class A surface.

Additionally the moldings, in terms of their appearance on the sheet side, ought to meet the requirements normally imposed on an automobile finish (cf. European patent EP 0 352 298 B1, page 15 line 42 to page 17 line 40). Thus, in particular, not only the weathering stability but also the chemical resistance of the transparent coating (KE) crosslinked to completion must not be inferior to those of conventional automobile clearcoat films. Finally the coating (KE) crosslinked to completion ought to have sufficient scratch resistance.

Solution to the Problem

This problem is solved, surprisingly, by means of a process, of the kind specified at the outset, wherein the free-radically crosslinkable component (KK)
(iv) contains on average per molecule >1, preferably ≧1.4, more preferably >2 branching points,
(v) contains 5%-50% by weight, preferably 10%-40% by weight, more preferably 15%-30% by weight, based in each case on the weight of component (KK), of cyclic structural elements, and
(vi) contains at least one aliphatic structural element having at least 6 carbon atoms in the chain, and
(vii) contains carbamate and/or biuret and/or allophanate and/or urea and/or amide groups.

The present invention also provides the sheets (F) which bear a coating (B) and are obtainable by the process, and provides for the use of the sheets (F) for producing moldings.

Advantages of the Invention

It is surprising and was not foreseeable that through the use of the specific component (KK) in the crosslinkable coating compositions (K) coatings are obtained in which, on the one hand, the coating (KT) as yet not crosslinked to completion no longer flows and, in the course of further processing, exhibits a sufficient mechanical stability, i.e., is not marked and does not stick and, on the other hand, crosslinking of the coating compositions (K) in the course of curing to completion is sufficient. Moreover, the removability of the sheet (T) from the coating (KT) without incidence of marks on the coating (KT) is ensured.

With the process of the invention, therefore, moldings are provided which in terms of their appearance on the sheet side ensure class A surfaces and meet the requirements normally imposed on an automobile finish (cf. European patent EP 0 352 298 B1, page 15 line 42 to page 17 line 40). Thus, in particular, both the weathering stability and the chemical resistance of the completely crosslinked transparent coating (KE) are not inferior to those of conventional automobile clearcoat films. The coating (KE) after crosslinking to completion, finally, also has sufficient scratch resistance.

DETAILED DESCRIPTION OF THE INVENTION

The Materials Used in the Process of the Invention

The Sheet (F) Bearing a Coating (B)
Crosslinkable Coating Composition (K)

It is essential to the invention that the free-radically crosslinkable component (KK) present in the crosslinkable coating composition (K) comprises one or more oligourethane(meth)acrylates and/or one or more polyurethane(meth)acrylates.

Here and in the text below, an oligomer is a compound generally containing on average from 2 to 10 base structures or monomer units. A polymer, in contrast, is a compound generally containing on average more than 10 base structures or monomer units. Mixtures or physical entities of this kind are also referred to by those skilled in the art as binders or resins.

In contradistinction thereto, here and in the text below, a low molecular mass compound is a compound derived essentially only from one base structure or one monomer unit.

The free-radically crosslinkable component (KK) contains preferably at least 50%, more preferably at least 70% and very preferably at least 80% by weight, based in each case on the solids content of component (KK), of one or more oligourethane(meth)acrylates and/or one or more polyurethane(meth)acrylates. In particular the free-radically crosslinkable component is composed 100% of one or more oligourethane (meth)acrylates and/or one or more polyurethane(meth) acrylates.

Moreover, the free-radically crosslinkable component (KK) contains preferably not more than 50%, more preferably not more than 30% and very preferably not more than 20% by weight of further free-radically crosslinkable constituents, and in particular contains no such constituents.

The free-radically crosslinkable component (KK) contains preferably less than 5%, more preferably less than 1%, by weight, based in each case on the weight of component (KK), of detectable free isocyanate groups, and in particular contains substantially no such isocyanate groups.

It is also preferred for the free-radically crosslinkable component (KK) present in the crosslinkable coating composition (K) to comprise a mixture of different oligo- and/or polyurethane(meth)acrylates, which may also have different double bond contents, molecular weights, double bond equivalent weights, and may differ in their amount of branching points and their amount of cyclic and relatively long-chain aliphatic structural elements and their amount of carbamate, biuret, allophanate, amide and/or urea groups.

This mixture can be obtained by mixing different oligo- and/or polyurethane(meth)acrylates or as a result of the simultaneous formation of different products during the preparation of a corresponding oligo- and/or polyurethane (meth)acrylate.

Besides the urethane(meth)acrylates, suitable further free-radically crosslinkable constituents of component (KK) include monomers, but preferably oligomers and/or polymers, especially polyester(meth)-acrylates, epoxy(meth) acrylates, (meth)acryloyl-functional(meth)acrylic copolymers, polyether(meth)acrylates, unsaturated polyesters, amino(meth)acrylates, melamine (meth)acrylates and/or silicone(meth)acrylates, preferably polyester(meth)acrylates and/or epoxy(meth)acrylates and/or polyether (meth)acrylates. Preference is given here to polymers which in addition to the double bonds also include hydroxyl, carboxyl, amino and/or thiol groups.

In order to obtain effective crosslinking it is preferred to use free-radically crosslinkable components (KK) featuring high reactivity of the functional groups, more preferably free-radically crosslinkable components (KK) which contain acrylic double bonds as functional groups.

The urethane(meth)acrylates can be prepared in a manner known to the skilled worker from isocyanate-functional compound and at least one compound containing groups that are reactive toward isocyanate groups, by mixing the components in any order, where appropriate at elevated temperature.

It is preferred in this case to add the compound containing isocyanate-reactive groups to the isocyanate-functional compound, preferably in two or more steps.

The urethane(meth)acrylates are obtained in particular by initially introducing the di- or polyisocyanate and subsequently adding at least one hydroxyalkyl(meth)acrylate or hydroxyalkyl ester of other ethylenically unsaturated carboxylic acids, and so first reacting some of the isocyanate groups. Thereafter a chain extender from the group of the diols/polyols and/or diamines/polyamines and/or dithiols/polythiols and/or alkanolamines is added and in that way the remaining isocyanate groups are reacted with the chain extender.

A further possibility is to prepare the urethane(meth)acrylates by reacting a di- or polyisocyanate with a chain extender and then reacting the remaining free isocyanate groups with at least one ethylenically unsaturated hydroxyalkyl ester.

It will be appreciated that all of the hybrid forms of these two methods are also possible. For example, some of the isocyanate groups of a diisocyanate can be reacted first with a diol, and then a further portion of the isocyanate groups can be reacted with the ethylenically unsaturated hydroxyalkyl ester, after which the remaining isocyanate groups can be reacted with a diamine.

In general the reaction is conducted at temperatures between 5 and 100° C., preferably between 20 to 90° C. and more preferably between 40 and 80° C., and in particular between 60 and 80° C.

It is preferred in this case to operate under water-free conditions. Water-free here means that the water content of the reaction system is not more than 5%, preferably not more than 3% and more preferably not more than 1% by weight.

In order to suppress polymerization of the polymerizable double bonds it is preferred to operate under an oxygen-containing gas, more preferably air or air/nitrogen mixtures.

As oxygen-containing gas it is possible with preference to use air or a mixture of oxygen or air and a gas which is inert under the conditions of use. The inert gas used may comprise nitrogen, helium, argon, carbon monoxide, carbon dioxide, steam, lower hydrocarbons or mixtures thereof.

The oxygen content of the oxygen-containing gas may be for example between 0.1% and 22% by volume, preferably from 0.5% to 20%, more preferably from 1% to 15%, very preferably from 2% to 10%, and in particular from 4% to 10% by volume. It will be appreciated that higher oxygen contents can also be used if desired.

The reaction may also be conducted in the presence of an inert solvent, examples being acetone, isobutyl methyl ketone, methyl ethyl ketone, toluene, xylene, butyl acetate or ethoxyethyl acetate.

Via the selection of the nature and amount of di- and/or polyisocyanate, chain extender and hydroxyalkyl esters used, control is exerted over the further variables of the urethane (meth)acrylates, such as, for example, double bond content, double bond equivalent weight, amount of branching points, amount of cyclic structural elements, amount of aliphatic structural elements having at least 6 carbon atoms, amount of biuret, allophanate, carbamate, urea and/or amide groups, and the like.

Through the selection of the particular amounts of di- or polyisocyanate and chain extender used and also through the functionality of the chain extender it is also possible, furthermore, to prepare urethane(meth)acrylates which besides the ethylenically unsaturated double bonds also contain other functional groups, examples being hydroxyl groups, carboxyl groups, amino groups and/or thiol groups or the like. The urethane(meth)acrylates preferably also contain hydroxyl groups and/or carboxyl groups.

Particularly if the urethane(meth)acrylates are to be used in aqueous coating compositions (K), some of the free isocyanate groups in the reaction mixtures are further reacted with compounds which contain an isocyanate-reactive group, preferably selected from the group consisting of hydroxyl, thiol, and primary and secondary amino groups, especially hydroxyl groups, and at least one, especially one, acid group, preferably selected from the group consisting of carboxyl groups, sulfonic acid groups, phosphoric acid groups and phosphonic acid groups, especially carboxyl groups. Examples of suitable compounds of this kind are hydroxyacetic acid, hydroxypropionic acid or gamma-hydroxybutyric acid, especially hydroxyacetic acid.

The polyester(meth)acrylates that are suitable in addition to the urethane(meth)acrylates are known in principle to the skilled worker. They can be prepared by a variety of methods. For example it is possible to use acrylic and/or methacrylic acid directly as an acid component in the synthesis of the polyesters. Another possibility is to use hydroxyalkyl esters of (meth)acrylic acid as an alcohol component directly in the synthesis of the polyesters. Preferably, however the polyester (meth)acrylates are prepared by acrylating polyesters. By way of example it is possible first to synthesize hydroxyl-containing polyesters, which are then reacted with acrylic or methacrylic acid. It is also possible first to synthesize carboxyl-containing polyesters, which are then reacted with a hydroxyalkyl ester of acrylic or methacrylic acid. Unreacted (meth)acrylic acid can be removed from the reaction mixture by washing, distillation or, preferably, by reaction with an equivalent amount of a monoepoxide or diepoxide compound, using appropriate catalysts, such as triphenylphosphine, for example. For further details of the preparation of polyester acrylates reference may be made in particular to DE-A 33 16 593 and DE-A 38 36 370 and also to EP-A-54 105, DE-B 20 03 579 and EP-B-2866.

The polyether(meth)acrylates that are also suitable are known as well in principle to the skilled worker. They can be prepared by a variety of methods. By way of example it is possible to obtain hydroxyl-containing polyethers, which are esterified with acrylic acid and/or methacrylic acid, by reacting dihydric and/or polyhydric alcohols with various amounts of ethylene oxide and/or propylene oxide in accordance with well-known methods (cf., e.g., Houben-Weyl, volume XIV, 2, Macromolecular Compounds II, (1963)). It is also possible to use polymerization products of tetrahydrofuran or of butylene oxide.

Via the selection of the nature and amount of alcohol component and acid component used control is exerted over the further variables of the polyether(meth)acrylates and polyester(meth)acrylates, such as, for example, double bond content, double bond equivalent weight, amount of branching points, amount of cyclic structural elements, amount of aliphatic structural elements having at least 6 carbon atoms, and the like.

Epoxy(meth)acrylates are also well known to the skilled worker, moreover, and therefore require no further elucidation. They are normally prepared by addition reaction of acrylic acid with epoxy resins, such as with epoxy resins based on bisphenol A or with other commercially customary epoxy resins, for example.

Moreover it is essential to the invention that the free-radically crosslinkable component (KK) has a double bond content of from 1.0 to 5.0 mol of double bonds per 1000 g of reactive component (KK), preferably a double bond content of from 1.5 to 4.0 mol of double bonds per 1000 g of reactive component (KK) and more preferably a double bond content of more than 2.0 to 3.5 mol of double bonds per 1000 g of reactive component (KK), the values being based in each case on the weight of the free-radically crosslinkable component (KK), but of course excluding nonreactive components, such as solvents, water or additives, for example.

As the skilled worker will be aware, the double bond content of component (KK) is connected not only with the amount of double bonds per molecule but also, in particular, with the number-average molecular weight of component (KK).

As the double bond content of component (KK) drops there is an improvement in the capacity of the transparent coating (KT) which has been dried but as yet not crosslinked to completion to no longer flow and to be no longer marked by any protective film that may be applied.

Decreasing double bond content of component (KK) is accompanied generally by a decrease in the crosslinking density of the transparent coating (KE) which has been crosslinked to completion.

As the skilled worker is aware, the molecular weight and the double bond content can be adjusted by way of the nature and amount of the building block components used and also by way of the reaction conditions.

It is further preferred that the free-radically crosslinkable component (KK) contains on average more than 1, preferably at least 2, ethylenically unsaturated double bond(s) per molecule. With particular preference the free-radically crosslinkable component (KK) contains more than 2.0 up to a maximum 20.0, preferably 4.0 to 17.0 and very preferably 6.0 to 14.0 double bonds per molecule.

In general the free-radically crosslinkable component (KK) contains not more than 10% by weight of compounds containing only one curable group, preferably not more than 7.5%, more preferably not more than 5%, very preferably not more than 2.5%, in particular not more than 1%, and especially 0% by weight.

As is also the case with increasing double bond content of the free-radically crosslinkable component (KK), increasing double bond content per molecule of the free-radically crosslinkable component (KK) is generally accompanied by an increase in the crosslinking density of the transparent coating (KE) crosslinked to completion. At the same time, however, increasing double bond content per molecule of the free-radically crosslinkable component (KK) is generally accompanied by a decrease in the breaking elongation of the completely crosslinked transparent coating (KE); in other words, the system becomes more brittle. Therefore the completely crosslinked transparent coating (KE) exhibits an increased tendency toward stress cracks after UV curing as the double bond content per molecule increases.

As described above, the double bonds are generally introduced into component (KK) by reacting one or more ethylenically unsaturated hydroxyalkyl esters with the isocyanate groups of the isocyanate and/or of the isocyanate prepolymer in the case of the urethane(meth)acrylates and/or with the acid groups of the polyester in the case of the polyester(meth) acrylates. It is likewise possible, as described above, to react the starting oligomers or starting polymers, such as polyesters, polyethers, epoxides and acrylate polymers, for example, with acrylic and/or methacrylic acid and/or another ethylenically unsaturated acid.

Examples of suitable ethylenically unsaturated hydroxyalkyl esters are hydroxyalkyl esters of acrylic and methacrylic acid, of maleic and fumaric acid, of crotonic and isocrotonic acid and of vinylacetic acid, preferably ethylenically unsaturated hydroxyalkyl esters of acrylic acid. More preferably the ethylenically unsaturated hydroxyethyl and/or hydroxypropyl and/or hydroxybutyl and/or hydroxypentyl and/or hydroxyhexyl esters, very preferably ethylenically unsaturated hydroxyethyl esters or ethylenically unsaturated hydroxybutyl esters or ethylenically unsaturated hydroxyethyl esters together with ethylenically unsaturated hydroxybutyl esters of the stated unsaturated acids are used, particularly those of acrylic acid.

It will be appreciated that for introducing the double bonds into component (KK) it is also possible to use hydroxyalkyl esters having more than one double bond per molecule, such as pentaerythrityl diacrylate and triacrylate or the like, for example. Commercially available mixtures of pentaerythrityl triacrylate/tetraacrylate may also be used such as, for example, the product marketed by UCB Chemicals under the name PETIA.

With very particular preference the double bonds are introduced into component (KK) using 2-hydroxyethyl acrylate and/or 4-hydroxybutyl acrylate and/or pentaerythrityl triacrylate.

The compound used to introduce the double bonds, depending on its structure, under certain circumstances itself affects the coating's properties, since not only the double bond content but also, under certain circumstances, other variables as well, such as the urethane group content, for example, are altered. If, for example, the double bond content of component (KK) is increased by replacing some of the chain extender by hydroxyethyl acrylate, then the urethane group content will be altered in accordance with the mass ratio of chain extender to hydroxyethyl acrylate. If, on the other hand, the double bond content of component (KK) is increased, for example, by using hydroxyalkyl esters having more than one double bond per molecule instead of hydroxyethyl acrylate, such as by using pentaerythrityl triacrylate and/or pentaerythrityl tetraacrylate, for example, then the urethane group content is lowered moderately.

It is further essential to the invention that the free-radically crosslinkable component (KK) has a number-average molecular weight of from 1000 to 50 000 g/mol, preferably from 2000 to 6000 g/mol and more preferably from 2200 to 5000 g/mol.

The higher the molecular weight of the reactive component (KK) the lower, generally, the crosslinking density of the completely crosslinked transparent coating (KE).

At the same time, the higher the molecular weight of the reactive component (KK), the higher, generally, the resistance of the transparent coating (KT) which has as yet not been crosslinked to completion.

It is further essential to the invention that the free-radically crosslinkable component (KK) contains on average per molecule >1, preferably ≧1.4, more preferably >2, branching points.

A reduction in the average number of branching points per molecule in component (KK) is generally accompanied by a decrease in the scratch resistance of the completely crosslinked transparent coating (KE). At the same time, with a reduction in the average number of branching points per molecule, there is generally a decrease in the resistance properties of the transparent coating (KT) which has been dried but as yet not crosslinked to completion.

The average number of branching points per molecule in component (KK) is generally adjusted by way of the amount of compounds used for synthesizing component (KK) that have a functionality of more than 2, in particular a functionality of at least 3.

The branching points of the free-radically crosslinkable component (KK) are preferably introduced via the use of isocyanates having a functionality of more than 2, in particular having a functionality of at least 3.

With particular preference the branching points are introduced by using trimeric and/or polymeric isocyanates, especially isocyanurates, and/or adducts or prepolymers having an isocyanate functionality of more than 2, especially allophanates and/or biurets, for preparing the oligo- and/or polyurethane (meth)acrylates employed in the free-radically crosslinkable component (KK). With very particular preference the branching points are introduced via the use of one or more isocyanurates and/or one or more biurets.

It is, however, also possible, when synthesizing the free-radically crosslinkable component (KK), to use alcohols, thiols or amines having a functionality of more than 2, through the use for example of pentaerythritol, dipentaerythritol, trimethylolethane, trimethylolpropane, ditrimethylolpropane and trishydroxyethyl isocyanurate.

It is further essential to the invention that the free-radically crosslinkable component (KK) contains 5%-50%, preferably 10%-40%, more preferably 15%-30% by weight, based in each case on the weight of component (KK) (but of course excluding nonreactive components, such as solvents, water or additives, for example), of cyclic structural elements.

An increasing amount of cyclic structural elements in component (KK) improves generally the capacity of the transparent coating (KT) which has been dried but as yet not crosslinked to completion to no longer flow and to be no longer marked by any protective film that may be applied.

As the amount of cyclic structural elements in component (KK) goes up there is also generally an increase in the chemical resistance, weathering stability and scratch resistance of the completely crosslinked transparent coating (KE). Moreover, with an excessive content of cyclic structural elements in component (KK), there is a decrease in the breaking elongation of the completely crosslinked coating (KE) and hence an increase in brittleness.

It is preferred for the free-radically crosslinkable component (KK) to comprise, as cyclic structural elements, monocyclic structural elements having 4 to 8, more preferably 5 to 6, ring members, and/or polycyclic structural elements having 7 to 18 ring members, more preferably dicyclic and/or tricyclic structural elements having preferably 10 to 12, very preferably tricyclodecane rings, and/or for the cyclic structural elements to be substituted.

The cyclic structural units may be cycloaliphatic, heterocyclic or aromatic, and are preferably cycloaliphatic and/or heterocyclic structural units. In particular a combination of cycloaliphatic and heterocyclic structural units is used.

The heterocyclic structural units may be in the chain—as in the case where uretdiones are used, for example,—and/or may form the branching points—as in the case where isocyanurates are used, for example. The cycloaliphatic structural units may likewise be in the chain—as in the case, for example, where cycloaliphatic diols are used, such as hydrogenated bisphenol A, to synthesize the urethanes—and/or may form the branching points. With particular preference, however, the heterocyclic structural units form the branching points while the cycloaliphatic structural units are in the chain.

Preferred cycloaliphatic structural elements are unsubstituted or substituted cyclopentane rings, unsubstituted or substituted cyclohexane rings, unsubstituted or substituted dicycloheptane rings, unsubstituted or substituted dicyclooctane rings and/or unsubstituted or substituted dicyclodecane rings and/or unsubstituted or substituted tricyclodecane rings, especially unsubstituted or substituted tricyclodecane rings and/or unsubstituted or substituted cyclohexane rings.

The heterocyclic structural units may be saturated, unsaturated or aromatic. It is preferred to use saturated heterocyclic structural units. The heteroatoms are preferably selected from the group nitrogen and/or oxygen and/or sulfur and/or phosphorus and/or silicon and/or boron, more preferably nitrogen. The number of heteroatoms per ring is usually 1 to 18, preferably 2 to 8 and more preferably 3.

Heterocyclic structural units used with particular preference are isocyanurate rings and/or uretdiones and/or unsubstituted or substituted triazine rings, especially isocyanurate rings.

Also suitable in principle for introducing the cyclic structural elements are aromatic structural elements, in which case the amount of aromatic structural elements is not more than 10%, preferably not more than 5% and more preferably not more than 2% by weight, based in each case on the weight of component (KK). This is because aromatic structural elements generally have adverse effects on the weathering stability of the resultant transparent coating (KE) crosslinked to completion, and so the amount of the aromatic structural elements is frequently limited for that reason.

The cyclic structural elements are introduced into the reactive component (KK) through the use of corresponding compounds having cyclic structural elements for preparing component (KK). Component (KK) can be prepared using, in particular, di- and/or polyisocyanates having cyclic structural elements and/or di- and/or polyols, di- and/or polyamines, and/or di- and/or polythiols having cyclic structural elements. Particular preference is given to using diols and/or polyols and/or diisocyanates and/or polyisocyanates having cyclic structural elements.

For preparing the oligo- and/or polyurethane(meth)acrylates used in the free-radically crosslinkable component (KK) it is therefore preferred to make at least proportional use, as isocyanate component, of isocyanurates of di- and/or polyisocyanates, which are commonly employed in the coatings industry. Instead of or together with these isocyanurates it is possible to use prepolymers and/or adducts, especially biurets and/or allophanates and/or uretdiones, of di- and/or polyisocyanates, which are commonly used in the coatings industry. Particular preference is given to using isocyanurates and/or biurets and/or allophanates and/or uretdiones of aliphatic and/or cycloaliphatic isocyanates. In addition it is also possible to use cycloaliphatic di- and/or polyisocyanates alone or in combination with the above-recited isocyanurates and/or biurets and/or allophanates and/or uretdiones.

Examples of (cyclo)aliphatic di- and/or polyisocyanates which are commonly used in the coatings industry include hexamethylene diisocyanate, octamethylene diisocyanate, decamethylene diisocyanate, dodecamethylene diisocyanate, tetradecamethylene diisocyanate, trimethylhexane diisocyanate, tetramethylhexane diisocyanate, isophorone diisocyanate, 2-isocyanatopropylcyclohexyl isocyanate, dicyclohexylmethane 2,4'-diisocyanate, dicyclohexylmethane 4,4'-diisocyanate, 1,4- or 1,3-bis(isocyanatomethyl)cyclohexane, 1,4- or 1,3- or 1,2-diisocyanatocyclohexane, 2,4- or 2,6-diisocyanato-1-methyl-cyclohexane, diisocyanates derived from dimer fatty acids, as sold under the commercial designation DDI 1410 by Henkel, 1,8-diisocyanato-4-isocyanatomethyloctane, 1,7-diisocyanato-4-isocyanatomethylheptane or 1-isocyanato-2-(3-isocyanatopropyl)cyclohexane, or mixtures of these polyisocyanates.

Also suitable, furthermore, are isocyanates containing aromatic structural elements in which, however, at least some of the isocyanate groups are attached to aliphatic and/or cycloaliphatic radicals, especially 1,3-bis(2-isocyanatoprop-2-yl)benzene (TMXDI).

For preparing the oligo- and/or polyurethane(meth)acrylates used in the free-radically crosslinkable component (KK) it is particularly preferred to make at least proportional use of the isocyanurate of (cyclo)aliphatic isocyanates, especially the isocyanurate of isophorone diisocyanate and/or hexamethylene diisocyanate. Very particular preference is given to using a mixture of the isocyanurate of isophorone diisocyanate and/or the isocyanurate of hexamethylene diisocyanate and/or the biuret of hexamethylene diisocyanurate and/or 1,3-bis(isocyanatomethyl)-cyclohexane and/or dicyclohexylmethane 4,4'-diisocyanate.

Further of suitability are the higher polyfunctional polyisocyanates described in EP-B-1 144 476 on page 4 line 43 to page 5 line 31 and based on isocyanurates (a2.1 therein), uretdiones (a2.2 therein), biurets (a2.3 therein), polyisocyanates containing urethane and/or allophanate groups (a2.4 therein), polyisocyanates containing oxadiazinetrione groups (a2.6 therein), and carbodiimide- or uretonimine-modified polyisocyanates (a.2.7 therein).

For preparing the oligomers and/or polymers used in the free-radically crosslinkable component (KK), especially the oligo- and/or polyurethane(meth)acrylates, preference is also given to making at least proportional use of cycloaliphatic diols and/or polyols and/or cycloaliphatic diamines and/or polyamines, especially cycloaliphatic diols, such as cyclohexanedimethanol, 1,2-, 1,3- or 1,4-cyclohexanediol, cyclooctanediol, hydrogenated bisphenol A, hydrogenated bisphenol F and tricyclo-decanedimethanol, for example.

Particular preference, for preparing the oligomers and/or polymers used in the free-radically crosslinkable component (KK), especially the oligo- and/or polyurethane (meth)acrylates, is given to using hydrogenated bisphenol A.

As already mentioned, cyclic structural elements can also be introduced by the use of aromatic structural elements—for example, via the proportional use of aromatic isocyanates or trimers and/or prepolymers and/or adducts of aromatic isocyanates, such as of 1,2-, 1,3- and 1,4-benzene diisocyanate, 2,4- and 2,6-tolylene diisocyanate, 4,4'-biphenylene diisocyanate, bis(4-isocyanatophenyl)methane, 2,2-bis(4-isocyanatophenyl)propane and the positionally isomeric naphthalene diisocyanates, especially the technical mixtures of 2,4- and 2,6-tolylene diisocyanate, for example. Further examples of suitable aromatic structural units are triazine rings.

These structural units may be introduced, for example, via the use of tris(alkoxycarbonylamino)triazines in accordance with U.S. Pat. No. 4,939,213, U.S. Pat. No. 5,084,541 and EP-A-624 577. Derivatives of the aforementioned compounds can also be employed.

It is essential to the invention, moreover, that the free-radically crosslinkable component (KK) comprises at least one aliphatic structural element having at least 6 carbon atoms, more preferably having 6 to 18 carbon atoms, very preferably having 6 carbon atoms, in the chain.

These structural elements have a flexibilizing effect on component (KK). As the amount of aliphatic structural elements having at least 6 carbon atoms in the chain in component (KK) goes up, therefore, there is a deterioration in the capacity of the transparent coating (KT) which has been dried but is not yet crosslinked to completion to no longer flow and to no longer be marked by any protective film that may be applied.

Moreover, the lower the amount of aliphatic structural elements having at least 6 carbon atoms in the chain, the better the chemical resistance of the transparent coating crosslinked to completion.

The free-radically crosslinkable component (KK) contains preferably 3%-30%, more preferably 5%-25% and very preferably 8%-20% by weight, based in each case on the weight of component (KK) (but of course excluding nonreactive components, such as solvents, water or additives, for example), of aliphatic structural elements having at least 6 carbon atoms in the chain.

Suitability for introduction into component (KK) is possessed by all relatively long hydrocarbon chains.

The introduction of this aliphatic structural element having at least 6 carbon atoms in the chain into the reactive component (KK) takes place through the use of corresponding compounds containing this aliphatic structural element having at least 6 carbon atoms in the chain for preparing component (KK). For preparing the urethane(meth)acrylates use may be made in particular of di- and/or polyisocyanates and/or chain extenders (diols and/or polyols, diamines and/or polyamines, dithiols and/or polythiols, dicarboxylic and/or polycarboxylic acids, etc.) containing this aliphatic structural element having at least 6 carbon atoms in the chain. Particular preference is given to using diols and/or polyols and/or dicarboxylic and/or polycarboxylic acids and/or diisocyanates and/or polyisocyanates containing this aliphatic structural element having at least 6 carbon atoms in the chain.

Suitability is possessed, for example, by dimeric and/or trimeric fatty acids for modifying the di- and/or polyisocyanate.

With particular preference this aliphatic structural element having at least 6 carbon atoms in the chain is introduced into the free-radically crosslinkable component (KK) through the use of correspondingly functionalized derivatives of hexamethylene, in particular through the use of compounds based on hexamethylene and additionally containing at least 1, preferably at least 2, isocyanate group(s) or OH and/or NH and/or SH group(s), in the preparation of the oligo- and/or polyurethane(meth)acrylates.

Examples of compounds which can be employed include hexamethylene diisocyanate and/or isocyanate-functional trimers and/or polymers and/or isocyanate-functional adducts of hexamethylene diisocyanate, especially the biuret and/or the isocyanurate of hexamethylene diisocyanate. Further possibilities for use include hexamethylenediol and/or hexamethylenediamine or similar compounds. A further possibility, finally, is the use of compounds which besides at least 1 ethylenically unsaturated double bond and at least 1 reactive group which is reactive toward isocyanate groups or OH groups or NH groups also contains said aliphatic structural element having at least 6 carbon atoms in the chain, such as hydroxyhexyl acrylate, for example.

Correspondingly the polyether(meth)acrylates and the polyester (meth)acrylates can also be flexibilized, for example, by reacting corresponding OH-functional prepolymers and/or oligomers (based on polyether or polyester) with relatively long-chain aliphatic dicarboxylic acids, especially aliphatic dicarboxylic acids having at least 6 carbon atoms, such as adipic acid, sebacic acid, dodecanedioic acid and/or dimer fatty acids, for example. This flexibilizing reaction can be carried out before or after the addition reaction of acrylic and/or methacrylic acid with the oligomers and/or prepolymers.

Flexibilization of the epoxy(meth)acrylates is possible in a similar way, for example, by reacting corresponding epoxy-functional prepolymers and/or oligomers with relatively long-chain aliphatic dicarboxylic acids, especially aliphatic dicarboxylic acids having at least 6 carbon atoms, such as adipic acid, sebacic acid, dodecanedioic acid and/or dimer fatty acids, for example. This flexibilization reaction can be carried out before or after the addition reaction of acrylic and/or methacrylic acid with the oligomers and/or prepolymers.

As set out above, the flexibilization of the polyether (meth) acrylates and/or of the polyester(meth)acrylates and/or of the epoxy(meth)acrylates, in other words an increase in amount of aliphatic structural elements having at least 6 carbon atoms in the chain, results in a deterioration in the capacity of the transparent coating (KT) which has been dried but as yet not crosslinked to completion to no longer flow and to no longer be marked by any protective film that may be applied.

Moreover, the lower the amount of aliphatic structural elements having at least 6 carbon atoms in the chain, the better the chemical resistance of the completely crosslinked transparent coating.

It is, finally, essential for the present invention that the free-radically crosslinkable component (KK) contains carbamate and/or biuret and/or allophanate and/or urea and/or amide groups. With particular preference component (KK) contains biuret and/or allophanate groups.

The greater the amount of carbamate and/or biuret and/or allophanate and/or urea and/or amide groups, the lower the tendency of the clearcoat film (KT) which has been dried but not yet crosslinked to completion to run.

The greater the amount of carbamate and/or biuret and/or allophanate and/or urea and/or amide groups, the better, too, in general, are the properties of the transparent coating (KE) crosslinked to completion.

With very particular preference the amount of carbamate and/or biuret and/or allophanate and/or urea and/or amide groups is adjusted via the nature and amount of the isocyanate adducts and/or isocyanate prepolymers that are used.

Preferably the free-radically crosslinkabe component (KK) has an average carbamate and/or biuret and/or allophanate and/or urea and/or amide group content of more than 0 to 2.0 mol per 1000 g of reactive component (KK), preferably from 0.1 to 1.1 and more preferably from 0.2 to 0.7 mol per 1000 g of reactive component (KK), the figures being based in each case on the weight of the free-radically crosslinkable component (KK), but of course excluding nonreactive components, such as solvents, water or additives, for example.

The crosslinkable coating composition (K) contains preferably from 30.0% to 99.9%, more preferably from 34.0% to 69.9% and very preferably from 38.8% to 59.5% by weight, based in each case on the overall weight of the coating composition (K), of component (KK).

The crosslinkable coating compositions (K) preferably comprise at least one initiator of chemical crosslinking. These initiators are preferably photoinitiators. The photoinitiator or photoinitiators is or are preferably selected from the group consisting of unimolecular (type I) and bimolecular (type II) photoinitiators. More preferably the photoinitiators of type I are selected from the group consisting of benzophenones in combination with tertiary amines, alkylbenzophenones, 4,4'-bis(dimethyl-amino)benzophenone (Michler's ketone), anthrone and halogenated benzophenones and the photoinitiators of type II are selected from the group consisting of benzoins, benzoin derivatives, especially benzoin ethers, benzil ketals, acylphosphine oxides, especially 2,4,6-trimethyl-benzoyldiphenylphosphine oxide and ethyl-2,4,6-trimethyl-benzoyl-phenyl-2,4,6-trimethylbenzoyldiphenylphosphine oxide, phosphinate, bisacylphosphine oxides, phenylglyoxyl, phenylglyoxylic esters, camphorquinone, alpha-aminoalkylphenones, alpha,alpha-dialkoxy-acetophenones and alpha-hydroxyalkylphenones.

If the crosslinking of the coating compositions is completed exclusively or additionally by thermal means then they preferably include C-C-cleaving initiators, preferably benzpinacols. Examples of suitable benzpinacols are benzpinacol silyl ethers or the substituted and unsubstituted benzpinacols as described in American patent U.S. Pat. No. 4,288,527 A in column 3 lines 5 to 44 and WO 02/16461, page 8 line 1 to page 9 line 15. Preference is given to using benzpinacol silyl ethers, particularly mixtures of monomeric and oligomeric benzpinacol silyl ethers.

The amount of the initiators in the crosslinkable coating compositions (K) can vary widely and is guided by the requirements of the case in hand and by the performance properties which it is intended the coatings (KE) produced therefrom should have. The amount is preferably from 0.1% to 10%, in particular from 1.0% to 7.0% by weight, based in each case on the solids of the coating composition (K).

Furthermore it is possible for the crosslinkable coating compositions (K) to comprise conventional additives in effective amounts. Normally the amount of these additives is between 0% and 10% by weight, preferably between 0.2% and 5.0% by weight, based in each case on the solids of the coating composition (K). They are preferably selected from the group consisting of light stabilizers, such as UV absorbers and reversible free-radical scavengers (HALS); antioxidants; wetting agents; emulsifiers; slip additives; polymerization inhibitors; adhesion promoters; leveling agents; film-forming auxiliaries; rheological assistants; corrosion inhibitors which are not pigments; flame retardants; free-flow aids; waxes; siccatives; biocides; and flatting agents.

Examples of suitable additives are described in detail in the textbook "Lackadditive" [Additives for coatings] by Johan Bieleman, Wiley-VCH, Weinheim, New York, 1998, in D. Stoye and W. Freitag (Editors), in German patent application DE 199 14 896 A 1, column 14 line 26 to column 15 line 46, or in German patent application DE 199 08 018 A 1, page 9 line 31 to page 8 line 30.

The crosslinkable coating compositions (K) generally further comprise conventional solvents and/or water, but may also be formulated substantially or entirely free from solvent and substantially or entirely free from water, as what are called 100% systems. If the coating compositions (K) include solvents, they contain preferably from 20% to 70%, more preferably from 30% to 64.5% and very preferably from 40% to 60% by weight, based in each case on the overall weight of the coating composition (K), of one or more solvents and/or water, preferably of one or more organic solvents.

Suitable solvents are all those commonly used in clearcoat materials, especially alcohols, glycol ethers, esters, ether esters and ketones, aliphatic and/or aromatic hydrocarbons, such as acetone, methyl isobutyl ketone, methyl ethyl ketone, butyl acetate, 3-butoxy-2-propanol, ethyl ethoxypropionate, butylglycol, dipropylene glycol methyl ether, butyl glycolate, Shellsol® T, pine oil 90/95, Solventnaphtha®, Shellsol® A, petroleum spirit 135/180 and the like, for example.

The crosslinkable coating composition (K) preferably contains less than 20%, in particular less than 10%, more preferably less than 5% by weight, based in each case on the weight of component (KK), and with very particular preference none at all, of polymeric saturated constituent (KS), especially no thermoplastic polymers.

In terms of its method the preparation of the coating compositions (K) has no particular features but instead takes place by the mixing and homogenizing of the above-described constituents using conventional mixing techniques and apparatus such as stirred tanks, agitator mills, kneaders, Ultraturrax, inline dissolvers, static mixers, toothed-wheel dispersers, pressure relief nozzles and/or microfluidizers, preferably in the absence of actinic radiation.

The transparent coating composition is normally applied in an amount such as to result in a dry film thickness of at least 20 μm, preferably a dry film thickness of from 30 to 160 μm, more preferably from 40 to 100 μm.

Pigmented Coating Composition (P)

As pigmented coating composition (P) use is made of solventborne or aqueous coating compositions (P) which in general are curable physically or thermally and/or with actinic radiation. However, pigmented coating compositions based on thermoplastic polymers are also used.

The pigmented coating compositions (P) employed normally comprise (I) optionally one or more solvents and/or water,
(II) one or more thermoplastic polymers or one or more binders, preferably polyurethane resins and/or acrylate resins, more preferably a mixture of at least one polyurethane resin and at least one acrylate resin,
(III) optionally at least one crosslinking agent,
(IV) one or more pigments, and
(V) optionally one or more customary auxiliaries and additives.

The pigmented coating compositions (P) preferably comprise one or more solvents and/or water.

Suitable pigmented coating compositions are described, for example, in U.S. Pat. No. 5,985,079, column 7 lines 15-38 and column 8 line 51 to column 9 line 17, in EP-B-551 409, page 4, lines 37 to 46, and also in EP-B1-1047556, page 4 lines 36-55.

Suitable pigmented coating compositions comprise, for example, one or more polymers, in particular one or more thermoplastic polymers, selected in particular from the group of urethane polymers, acrylic polymers and methacrylic polymers, vinyl polymers, fluoropolymers, and mixtures of these polymers. Suitable fluoropolymers are polyvinylidene fluoride homopolymers and polyvinylidene fluoride copolymers, which are available commercially, for example, under the name KYNAR® from Elf Atochem and SOLEF®, from Solvay, especially copolymers of vinylidene fluoride and hexafluoropropylene. Also suitable are mixtures of fluoropolymers and acrylic polymers, as described in EP-B-551 409, page 4, lines 43 to 46. As described in EP-B1-1047556, page 4, lines 49-55, these pigmented coating compositions (P) are used preferably as a solution or as a dispersion of the polymers, in particular as a solution or as a dispersion of polyvinylidene fluoride homopolymers and polyvinylidene fluoride copolymers, in an organic solvent.

It is preferred to use the customary and known, physically and/or thermally curable, conventional or aqueous basecoat materials (P) such as are known, for example, from WO 03/016095 A 1, page 10 line 15 to page 14 line 22, or in particular from U.S. Pat. No. 5,030,514, column 2 line 63 to column 6 line 68 and column 8 line 53 to column 9 line 10, and also EP-B-754 740, column 3 line 37 to column 6 line 18.

Very particular preference is—optionally—given to using thermally curable aqueous basecoat materials (P).

Suitable binders are the polyurethane resins and acrylate resins commonly used in basecoat materials in the field of the automobile industry, the flexibility of the binders, in particular, and hence their suitability for the process of the invention, being controlled, in a manner known to the skilled worker, via the selection of the nature and amount of the building block components used for preparing these binders. For details reference may again be made, for example, to U.S. Pat. No. 5,030,514, column 2 line 63 to column 6 line 68 and column 8 line 53 to column 9 line 10.

Additionally the pigmented coating compositions also preferably comprise, as crosslinking agent, at least one amino resin. Suitability is possessed in principle by the amino resins usually used in the field of the coatings industry, the properties of the pigmented coating compositions being controllable via the reactivity of the amino resins.

The amount of binder and, where appropriate, amino resin in the pigmented coating composition can be varied widely and is usually from 0% to 70%, preferably from 10% to 60%, by weight of polyurethane resin, from 0% to 70%, preferably from 10% to 60%, by weight of acrylate resin, and from 0% to 45%, preferably from 5% to 40%, by weight of amino resin, based in each case on the overall amount of binder plus amino resin.

Based on the overall weight of the pigmented coating composition (P) the fraction of binder plus, where appropriate, amino resin is usually from 10% to 50% by weight.

The pigmented coating composition (P) further comprises at least one pigment. The pigment is preferably selected from the group consisting of organic and inorganic, color, effect, color and effect, magnetically shielding, electrically conductive, anticorrosion, fluorescent and phosphorescent pigments. It is preferred to use the color and/or effect pigments.

Examples of suitable effect pigments, which may also impart color, are metal flake pigments, such as commercial aluminum bronzes, aluminum bronzes chromated in accordance with DE 36 36 183 A 1, and commercial stainless steel bronzes, and also nonmetallic effect pigments, such as pearlescent pigments and interference pigments, platelet-shaped effect pigments based on iron oxide or liquid-crystalline effect pigments, for example. For further details refer to Römpp Lexikon Lacke und Druckfarben, Georg Thieme Verlag, 1998, page 176, "Effect pigments" and pages 380 and 381 "metal oxide-mica pigments" to "metal pigments".

Suitable organic and/or inorganic color pigments are the pigments normally used in the coatings industry.

The amount of the pigments in the coating composition (P) can vary very widely and is guided primarily by the depth of the color and/or the intensity of the effect which are to be brought about, and also by the dispersibility of the pigments in the coating compositions (P). Preferably the pigment content, based in each case on the coating composition (P), is from 0.5% to 50%, preferably from 1% to 30%, more preferably from 2% to 20% and in particular from 2.5% to 10% by weight.

Besides the above-described pigments the coating composition (P) may comprise conventional auxiliaries and additives, such as organic and inorganic, transparent and opaque fillers and nanoparticles, and also further customary auxiliaries and additives, in customary amounts, preferably from 0% to 40% by weight, based on the coating composition (P).

The pigmented coating composition (P) is normally applied in amounts such as to result in a dry film thickness of at least 20 µm, preferably a dry film thickness of from 25 to 160 µm, more preferably from 25 to 80 µm.

Backing Sheet (T)

Backing sheets (T) suitable for the application of the coating composition (K) include all commonly employed backing sheets, provided they ensure the necessary surface quality of the transparent coating (KE) crosslinked to completion. Use is made in particular of backing sheets having a smooth surface, i.e., as little roughness as possible, in order to prevent the transfer of a surface texture from the backing sheet to the coating (KE), as described, for example, in EP-B-1 047 556, page 3 lines 2 to 4 and 44 to 48, and in U.S. Pat. No. 5,985, 079, column 2 lines 47-64 and column 7 line 59 to column 8 line 15.

The backing sheet (T) has, in accordance with U.S. Pat. No. 4,931,324, column 6 lines 14-44, a maximum roughness $R_a$ preferably of <10 nm, more preferably of <6 nm.

Examples of suitable backing sheets include known backing sheets based on polyesters, and based with particular preference on polyethylene terephthalate (PET), which preferably contain no additives which lower the gloss and DOI in the coating (KE) or increase the surface haze. Very particular preference is therefore given to using backing sheets which contain none of what are known as slip additives.

Examples of suitable sheets are those described in EP-B-551 409 on page 4 lines 17 to 28 and based on polypropylene and polyesters, such as polyethylene terephthalate (PET), ethylene glycol-modified polyethylene terephthalate (PETG) or polybutylene terephthalate, for example, which are also sold commercially for example, under the names Extrel from Exxon and Bicor from Mobil, in the case of polypropylene sheets, and Pacur from Pacur in the case of PETG sheets, and also the backing sheets described in U.S. Pat. No. 5,985,079, column 7 line 59 to column 8 line 15, and also the backing sheet available commercially under the name Melinex 455 from DuPont Teijin Films.

The average layer thickness of the backing sheets (T) used in accordance with the invention is generally 50 µm.

Tiecoat (H)

It is preferable that the pigmented coating (PB), on its side facing away from the transparent coating, has a tiecoat (H). Conventional tiecoats are used, the tiecoat normally being brought into line with, on the one hand, the pigmented coating and, on the other hand, the substrate layer to which the sheet (F) of the invention is to be applied.

The tiecoat normally has a thickness of from 5 to 50 µm.

To produce moldings by means of the sheets (F) of the invention it is possible, as described later on below, to laminate the sheet (F) directly onto the substrate with the aid of a tiecoat (H). In this case—as described, for example, in EP-B1-1 047 556, page 4 line 56 to page 5 line 7, and in U.S. Pat. No. 5,985,079, column 11 lines 31-37—the tiecoat is advantageously selected such that the initial adhesion to the substrate (molding) is very low, in order to allow corrections to be made, where appropriate, to the position of the sheet on the substrate. The final bond between sheet and substrate, on the other hand, ought to be extremely durable, in order to prevent the sheet detaching from the molding in the course of subsequent service.

As described for example in U.S. Pat. No. 5,985,079, column 10 line 31 to column 11 line 30, it is also possible in accordance with the invention, however, to link the sheet (F) by a tiecoat (H) to a further, thermoformable backing sheet (C) and then to carry out injection backmolding of the sheet with the polymeric material (KM). It will be appreciated that in this case it is necessary to ensure effective adhesion not only between (PB) and (H) but also between (C) and (H).

Examples of suitable tie agents (adhesion promoters) are those based on acrylate copolymers, chlorinated polyolefins, urethanes or the like. Preference is given to using tiecoats (H) which can be activated by pressure or heat. Suitable tie agents are also described, for example, in U.S. Pat. No. 5,985,079, column 10 line 30 to column 11 line 30.

Thermoformable Backing Sheet (C)

The backing sheet (C) is composed essentially or entirely of at least one thermoplastic polymer. The thermoplastic polymer is preferably selected from the group consisting of conventional and known homopolymers and copolymers of linear, branched, star-shaped, comb and/or block construction. The homopolymers and copolymers are preferably selected from the group consisting of polyurethanes, polyesters, especially polyethylene terephthalates and polybutylene terephthalates, polyethers, polyolefins, especially polypropylene, polyamides, thermoplastic polyolefins (TPO), such as (PP/EPDM), polycarbonates, polyvinyl chlorides, polyvinylidene fluorides, poly(meth)acrylates, especially polymethyl methacrylates and polybutyl methacrylates, and impact-modified polymethyl methacrylates, polystyrenes, especially impact-modified polystyrenes, more particularly acrylonitrile-butadiene-styrene copolymers (ABS), acrylic-styrene-acrylonitrile copolymers (ASA) and acrylonitrile-ethylene-propylene-diene-styrene copolymers (A-EPDM); polyetherimides, polyetherketones, polyphenylene sulfides, polyphenylene ethers, and blends of these polymers.

By ASA are meant, in general, impact-modified styrene/acrylonitrile polymers, in which graft copolymers of vinylaromatic compounds, especially styrene, and of vinyl cyanides, especially acrylonitrile, on polyalkyl acrylate rubbers are present in a copolymer matrix comprising, in particular, styrene and acrylonitrile.

With particular advantage use is made of polypropylene, ASA, polycarbonates, blends of ASA and polycarbonates, polymethyl methacrylates or impact-modified polymethyl methacrylates, especially blends of ASA and polycarbonates, preferably with a polycarbonate fraction >40%, in particular >50%.

Materials used with preference for the backing sheet (C) are also, in particular, the thermoplastic polymers described in DE-A-101 13 273 on page 2 line 61 to page 3 line 26.

The homopolymers and copolymers may comprise the additives conventional within the field of thermoplastics. They may further comprise conventional fillers, including reinforcing fillers, and fibers. Not least they may also comprise the pigments, including effect pigments, and/or conventional dyes, and so allow the shade of the backing sheets to be matched to the shade of the coating obtained from the pigmented coating compositions (P).

The layer thickness of the backing sheet (C) is usually more than 0.5 mm, preferably between 0.7 and 2.0 mm and more preferably between 0.9 and 1.2 mm.

Protective Film (S)

Particularly if the sheets (F) of the invention, provided with a coating (B), are to be further-processed by means of the thermoforming technique, the backing sheet (T)—preferably after application of the tiecoat (cf. also EP-B-1 047 556, page 3 paragraph 0015)—is removed and replaced by a protective film (S).

Suitable protective films (S) are all commonly used protective films, which may be in single-layer or multilayer form. Preference is given to using thermoformable protective films. These protective films are selected in particular such that, during the further processing of the sheets, and in particular during thermoforming, impairments are avoided to the properties of the transparent coating, such as matting, deterioration in DOI (distinctness of image) and the like, in particular.

Use is made in particular of the protective films described in WO 00/51798, page 7 line 8 to page 9 line 4, of those described in WO 02/00448, page 7 line 17 to page 10 line 2, and of those described in DE-A-10335620, page 7 para. 0059 to page 8 para. 0072.

Particularly suitable protective films (S) are those based on polyurethane polymers, polyesterurethanes, polyetherurethanes or homopolymers and copolymers of polyethylene, polypropylene, ethylene copolymers, propylene copolymers, and ethylene-propylene copolymers.

The protective film is preferably selected such that with a layer thickness of 50 μm it has a transmittance >70% for UV radiation and visible light with a wavelength of from 230 to 600 nm.

Additionally it is preferred to use protective films which in the temperature range from room temperature to 100° C. have a storage modulus E' of at least $10^7$ Pa and also have a breaking elongation >300% at 23° C. both longitudinally and transversely to the preferential direction generated during the production of the protective film by means of directed production methods. With particular preference the side of the protective film that faces the coating (B) additionally has a hardness <0.06 GPa at 23° C. and a roughness as determined by atomic force microscopy (AFM) corresponding to an $R_a$ value from 50 μm²<30 nm. With very particular preference the protective films (S) are from 10 to 100 μm, in particular from 30 to 70 μm, thick.

The protective films (S) for use in accordance with the invention are conventional and are sold, for example, by Bischof+Klein, D-49525 Lengerich, under the designations GH-X 527, GH-X 529 and GH-X-535.

Polymeric Material (KM)

The liquid or softened polymeric material (KM) preferably comprises at least one melted or softened, thermoplastic polymer, in particular at least one of the thermoplastic polymers described above in connection with the thermoformable backing sheet (C), or consists thereof.

It is preferred to use polymeric materials which comprise fibers, the term "fibers" also including platelet-shaped products. Examples of suitable fibers are carbon, aramid, steel or glass fibers and aluminum flakes, preferably glass fibers.

Also suitable, for example, are the polymeric materials described in DE-A-101 13 273 on page 4 line 44 to page 5 line 45.

The version of the process in which a melted or softened thermoplastic polymer of this kind is used is also referred to as backing by injection molding or by compression molding.

Alternatively the liquid or softened polymeric material may comprise a conventional reactive mixture which forms the solid polymeric material (KM) in the compression or injection mold. The polymeric material (KM) may likewise comprise the additives described above in connection with the backing sheet (C). It is also possible, furthermore, to use polymeric materials (KM) which include pore-forming blowing agents. Examples of suitable reactive mixtures are the known reactive mixtures that are normally used in foam backing processes, especially polyurethane foams, examples being the reactive mixtures described in EP-B-995 667, especially in EP-B-995 667, column 2 line 40 to column 3 line 14; column 5 lines 23 to 29; and column 8 lines 33 to 38.

The version of the process in which a reactive mixture of this kind or mixture (KM) including blowing agent is used is also referred to as foam backing by reaction-injection molding, RIM.

Process for Producing the Sheets (F) Bearing a Coating (B)

Process Step 1

The coating composition (K) may be applied in one or more layers, preferably in one layer, by means of directed and nondirected application methods. Preferably the coating composition (K) is applied by directed application methods. Knife coaters, casting apparatus and rolls are used in particular. Coating composition (K) is applied very preferably using cast-film extruders. The coating compositions (K) are preferably applied and processed further in the absence of actinic radiation.

Examples of suitable nondirected application methods and apparatus therefor are known from WO 03/016095 A 1, page 20 line 4 to page 23 line 25, examples being pneumatic or electrostatic spraying apparatus.

Process Step 2

It is essential that, following its application, the applied coating composition (K) is dried and/or partially crosslinked to give a coating (KT) as yet not crosslinked to completion.

The coating (KT) thus obtained must no longer flow and in the course of further processing, particularly during the application of the pigmented coating compositions, must not stick to the apparatus or be marked by it. This ensures that moldings are obtained which in terms of their sheet-side appearance satisfy the requirements imposed on a class A surface.

For the drying or conditioning of the wet pigmented coating and also of the wet transparent coating it is preferred to use thermal and/or convection methods, in which case conventional apparatus is employed, such as tunnel ovens, NIR and IR radiant heaters, fans and blowing tunnels. Combinations of such apparatus may also be used.

Normally and as described, for example, in WO 99/37479, page 5 line 29 to page 6 line 2, the drying and/or conditioning of the transparent coating takes place such that the coating is flashed off at ambient temperature (generally 25° C.) or slightly elevated temperature and then dried at elevated temperature (preferred oven temperature from 100 to 250° C., more preferably 150 to 200° C.).

Process Step 3

The pigmented coating composition (P) can be applied in one layer or in two or more layers by means of directed and nondirected application methods to the coating (KT). Application takes place preferably by means of directed application methods.

Particularly in the case of application of pigmented coating compositions which comprise metallic pigments and/or effect pigments, however, it may be necessary for the pigmented composition to be applied by means of specific methods. If, in this case, the pigmented coating composition (P) is applied in only one layer, then this takes place preferably by means of a nondirected application method, which in the resulting pigmented coatings does not induce any arrangement of the pigments in a preferential direction. In other words, the pigments are distributed isotropically in the coating. Examples of suitable nondirected application methods and apparatus therefor are known from WO 03/016095 A 1, page 20 line 4 to page 23 line 25. Use is made in particular of pneumatic or electrostatic spraying apparatus, as described in WO 03/016095 A 1, page 20 line 4 to page 23 line 25.

If in this specific case the pigmented coating composition (P) is applied in two or more layers, then this is preferably done such that the second layer or, where there are more than two pigmented layers in total, the second and the subsequent layers is or are applied by means of a directed application method which in the resulting pigmented coating induces an arrangement of the pigments in a preferential direction, i.e., an anisotropic distribution of the pigments. Examples of suitable directed application methods are known from WO 03/016095 A 1, page 15 lines 6 to 19. Knife coaters, casting apparatus, and rolls are used in particular. The first pigmented layer is then applied by means of the above-described nondirected application method.

Process Step 4

A coating (PB) is produced from the coating composition (P) applied in stage 3 in the process step 4. Normally and as described, for example, in WO 99/37479, page 7 lines 16 to 22, this takes place by drying and/or conditioning or partial and/or complete crosslinking of the pigmented coating in analogy to the drying of the transparent coating such that the coating is flashed off at ambient temperature (generally 25° C.) or a slightly elevated temperature of up to 80° C. and then dried at elevated temperature (preferred oven temperature from 100 to 250° C., more preferably 150 to 200° C.). If, however, solvent-free pigmented coating compositions (P) are used, this drying and optionally subsequent crosslinking can, however, be superfluous and the coating (PB) is obtained directly—optionally after the coating composition (P) has cooled, if applied at high temperature.

Process Step 5

The tiecoat can be applied to the pigmented coating (PB) in a variety of ways. For instance it is possible, for example, to apply the tiecoat directly from solution to the pigmented coating (PB) and then to dry it by means of customary methods.

A further possibility, for example, is to apply the tiecoat in a separate process step—as described in EP-B-1 047 556, page 5 lines 1 to 7 and FIG. 2—from solution or from the melt to a smooth release film (R) by means of casting or by means of extrusion. If application has taken place from solution, the tiecoat thereafter is first dried by means of customary drying methods, before being applied to the coated sheet. The resultant sheet with the release film can then be wound up into rolls, for example, and supplied to the manufacturer of the moldings. The release film is then removed shortly before the sheet (F) is applied to the substrate. Alternatively the release film can be removed directly after the application of the tiecoat to the coating (PB), especially if the thermoformable backing sheet (C) is applied directly to the tiecoat.

Examples of suitable release films (R) include the known, optionally silicone-coated polyethylene terephthalate films or polyolefin films. Preference is given to using release films having a smooth surface, since any surface texture present may be transferred to the transparent coating (KE) and hence may adversely affect the overall appearance of the sheet (F).

Process Variant

Particularly if the sheets (F) of the invention, provided with a coating (B), are to be further-processed by means of the thermoforming technique, the backing sheet (T)—preferably after application of the tiecoat (cf. also EP-B-1 047 556, page 3 paragraph 0015), i.e., following process step 5—is removed and replaced by a protective film (S).

Use of the Sheets (F) for Producing Moldings

There are a variety of possibilities for producing moldings using the sheets (F).

For instance, the sheets with the tiecoat can be laminated directly onto a substrate. This is particularly of interest in the case of moldings whose production requires only low levels of deformation. In this case the transparent coating composition can be crosslinked to completion at any point in time during the process, thus including, for example, prior to application of the pigmented coating. In this case as well, however, the crosslinking of the transparent coating to completion takes place preferably only after the sheet (F) has been applied by means of (H) to the substrate. In this case the backing sheet (T) is removed preferably after the sheet (F) has been applied to the substrate but before the transparent coating has been cured to completion.

In this case the structure of the molding is as follows:
Optionally, backing sheet (T)
Transparent coating (KE)
Pigmented coating
Tiecoat (H)
Substrate For the production of moldings, however, it is preferred to use the sheets by means of injection backmolding or foam backing. In this case the sheet bearing the coating is laminated by means of the tiecoat onto a thermoplastic backing sheet (C), as described for example in EP-A-1 047 556, page 4 line 56 to page 5 line 7. After that, or else even before lamination to the backing sheet (C), the backing sheet (T) is removed and the protective film (S) is applied to the transparent coating (KT). The resulting film thus has the following construction:
Protective film (S)
Transparent coating (KT)
Pigmented coating (PB)
Tiecoat (H)
Backing sheet (C)

This sheet is then further-processed in a way familiar to the skilled worker by means of the injection backmolding/foam backing technology to form the moldings. By way of example reference may be made here merely to DE-A-101 13 273, page 5 line 47 to page 7 line 35.

This sheet (S/KT/PB/H/C) is inserted into an opened mold, in particular a thermoforming mold. For this purpose the sheet can be wound from a roll and cut into suitably sized sections. Thereafter, the sheet (F) or the cut-to-size sections—in particular in the thermoforming mold—can be preformed, and in particular can be adapted to the contours of the injection molds. These three-dimensional preformed sections are placed in a mold, in particular an injection mold.

However it is also possible for the sheet (F) or cut-to-size sections of the sheet (F) to be placed directly in a mold, in particular an injection mold or mold, i.e. without prior three-dimensional forming, and to form it directly in this mold.

The mold is then closed and the side of the thermoformable backing sheet (C) that faces away from the surface (H) is contacted with a liquid or softened polymeric material (KM), as a result of which the coated thermoplastic backing sheet (C) is, where appropriate, shaped and joined firmly to the polymeric material (KM). Subsequently the polymeric material (KM) is solidified.

The molding thus obtained is removed from the mold. It can be further-processed immediately thereafter or stored until the crosslinking of the transparent coating to completion.

Crosslinking to Completion of the Transparent Coating Compositions (K)

The crosslinking of the coating (KT) to completion takes place—as already remarked in connection with the description of the moldings—at any desired point in time in the course of the process. Crosslinking may also take place in two or more steps, so that—following one or more partial cures, where appropriate—complete crosslinking takes place. Where appropriate it is also possible in this process step for the pigmented coating to be crosslinked or postcrosslinked.

The transparent coating (KT) as yet not crosslinked to completion, however, has better thermoformability than the completely crosslinked coating (KE). Preferably, therefore, the coating (KT) is crosslinked to completion following deformation, in particular after the sheet (F) has been adapted to the contour of the mold into which the sheet (F) is inserted. Since, however, the mechanical load-bearing capacity of the transparent coating (KT) as yet not crosslinked to completion is reduced as compared with that of the completely crosslinked coating (KE), and since as high as possible a load-bearing capacity is desirable when injection backmolding, simply because of the high pressures that are normally employed, it is also preferred, in order to prevent damage to the sheet and hence to ensure the required class A surface, to effect crosslinking to completion prior to injection backmolding, but after the thermoforming and/or the deep-drawing.

A further possibility is to carry out crosslinking to completion at an elevated temperature, preferably at a temperature between 25 and 150° C., in particular between 40 and 120° C. and very preferably between 50 and 100° C. The elevated temperature may be attained by means of specific heating, by means for example of IR lamps, heated air or other customary apparatus. An alternative possibility, however, is to utilize the temperature increase brought about by the injection backmolding operation.

The crosslinking of the coating composition (K) to completion takes place preferably by means of high-energy radiation, in particular by means of UV radiation. With particular preference the crosslinking to completion is carried out as described in WO 03/016095 A 1, page 27 line 19 to page 28 line 24. An alternative possibility is to carry out the crosslinking to completion thermally, exclusively or in addition to radiation curing.

Crosslinking to completion is preferably carried out using radiation with a radiation dose of from 100 to 6000, preferably from 200 to 3000, more preferably from 300 to 2500 and very preferably from 500 to 2000 mJ cm$^{-2}$, the range <2000 mJ cm$^{-2}$ being especially preferred.

Irradiation is preferably carried out under oxygen-depleted conditions. This irradiation can take place before removing the backing sheet (T) or before removing the protective sheet (F), as long as these sheets have an appropriate UV-permeability. Irradiation can also be carried out under an oxygen-depleted atmosphere. "Oxygen-depleted" means that the oxygen content of the atmosphere is lower than that of air (20.95% by volume). In principle the atmosphere may also be oxygen-free: in other words, may constitute an inert gas. Owing to the lack of the inhibitory effect of oxygen, however, this may produce a sharp acceleration in radiation curing, possibly leading to inhomogeneities and stresses in the crosslinked materials of the invention. It is therefore of advantage not to lower the oxygen content of the atmosphere to zero % by volume.

Use of the Moldings

The moldings obtained by the process of the invention have an extremely broad spectrum of possible applications. For instance they can be used to outstanding effect as interior or exterior bodywork components, as components for shipbuilding and aircraft construction, as components for rail vehicles or as components for household and electrical appliances, for buildings, windows, doors, furniture and articles of everyday use of any kind. They are preferably used as interior or exterior bodywork components or modules, in particular for automobiles, trucks and buses.

Since the moldings, in their sheet-side appearance, satisfy the requirements of a class A surface and meet the requirements normally imposed on an automotive finish, they are suitable to particularly outstanding effect as exterior mounted components for automobile bodies, especially for bodies of top-class automobiles, such as, for example, for producing hardtops, tailgates, bonnets, fenders, doors, bumpers, spoilers, mirrors, and the like, for example.

Example 1

1.1 Preparation of the UV-Curable Coating Composition (K1)

1.1.1 The Preparation of the Organic Solution of a Urethane Acrylate (Organic Solution of Component (KK1))

A urethane acrylate was prepared from the building block components set out below by coarsely dispersing the hydrogenated bisphenol A in 2-hydroxyethyl acrylate at 60° C. with stirring. Added to this suspension were the isocyanates, hydroquinone monomethyl ether, 1,6-di-tert-butyl-para-cresol and methyl ethyl ketone. After dibutyltin dilaurate had been added the mixture heated up. Stirring was carried out at an internal temperature of 75° C. for a number of hours until there was virtually no longer any change in the NCO value of the reaction mixture. Any free isocyanate groups still present after the reaction were reacted by adding a small amount of methanol.

104.214 g of hydrogenated bisphenol A (corresponding to 0.87 equivalent of hydroxyl groups), 147.422 g (corresponding to 0.77 equivalent of isocyanate groups) of Basonat® HI 100 from BASF AG=commercial isocyanurate of hexamethylene diisocyanate with an NCO content of 21.5%-22.5% (DIN EN ISO 11909), 147.422 g (corresponding to 0.77 equivalent of isocyanate groups) of Basonat® HB 100 from BASF AG=commercial biuret of hexamethylene diisocyanate with an NCO content of 22%-23% (DIN EN ISO 11909), 124.994 g (corresponding to 0.51 equivalent of isocyanate groups) Vestanat® T1890 from Degussa=commercial isocyanurate of isophorone diisocyanate with an NCO content of 11.7%-12.3% (DIN EN ISO 11909)
131.378 g of 2-hydroxyethyl acrylate (corresponding to 1.13 equivalents of hydroxyl groups)
0.328 g of hydroquinone monomethyl ether (0.05% on solids)
0.655 g of 1,6-di-tert-butyl-para-cresol (0.1% on solids)
methyl ethyl ketone (70% solids)
0.066 g of dibutyltin dilaurate (0.01% on solids)
4.500 g of methanol (corresponding to 0.14 equivalent of hydroxyl groups)

The component (KK1) thus obtained has the following characteristics:
- on average 4.6 ethylenically unsaturated double bonds per molecule
- a double bond content of 1.74 mol of double bonds per 1000 g of urethane acrylate solids
- on average 2.2 branching points per molecule
- 25% by weight of cyclic structural elements, based on the solids content of the urethane acrylate.

1.1.2 The Preparation of a UV-Curable Coating Composition (K1)

143.00 parts by weight of the above-described organic solution of the urethane acrylate (KK1) were charged to a suitable stirred vessel. Added to the initial charge over the course of 30 minutes was a mixture of 1.0 part by weight of Tinuvin® 292 (commercial HALS light stabilizer from Ciba Specialty Chemicals, based on a mixture of bis(1,2,2,6,6-pentamethyl-4-piperidinyl) sebacate and methyl (1,2,2,6,6-pentamethyl-4-piperidinyl)sebacate), 2.4 parts by weight of the commercial light stabilizer solution Tinuvin® 400 (commercial light stabilizer from Ciba Specialty Chemicals, based on a mixture of 2-(4-2-(4-2-(4-((2-hydroxy-3-dodecyloxypropyl)oxy)-2-hydroxyphenyl)-4,6-bis(2,4-dimethylphenyl)-1,3,5-triazine and 2-(4-((2-hydroxy-3-tridecyloxypropyl)oxy)-2-hydroxy-phenyl)-4,6-bis(2,4-dimethylphenyl)-1,3,5-triazine), 85% in 1-methoxy-2-propanol), 0.8 part by weight of Lucirin® TPO-L (commercial photoinitiator from BASF Aktiengesellschaft, based on ethyl 2,4,6-tri-methyl-benzoyldiphenylphosphinate)oxide), 2.40 parts by weight of Irgacure® 184 (commercial photoinitiator from Ciba Specialty Chemicals, based on 1-hydroxycyclohexyl-1-hydroxy-cyclohexylphenyl ketone)phenyl ketone), used in the form of 3.0 parts of an 80% solution in acetone, and 0.2 part by weight Byk of a commercial polyether-modified polydimethylsiloxane (used in the form of 1.7 parts of a commercial 12.5% solution of the polyether-modified polydimethyl-siloxane polydimethylsiloxane) were added to xylene/monophenyl glycol 7/2=Byk® 306 from Byk Chemie) at room temperature with continuous stirring and adjusted with 3-butoxy-2-propanol to a solids content of 48%. The resulting mixture was subsequently stirred at room temperature for 30 minutes.

1.2. Production of the Thermoformable Sheet 1 Provided with a Coating

A commercially customary biaxially oriented backing sheet (T) based on polyester (commercial product Melinex 455 from DuPont Teijin Films) having an extremely smooth surface was knife-coated with the above-described coating composition (K1) in a wet film thickness of 200 µm, flashed off and then dried at 150° C. in a forced-air oven.

The dried, transparent coating (KT1) thus obtained was knife-coated with an aqueous metallic basecoat material (color: black metallic) in a wet film thickness of 150 µm, flashed off and then dried in a forced-air oven at 150° C.

The pigmented coating (PB) obtained in this way was laminated with a commercially customary assembly comprising a tiecoat (H) and a release film.

The release film was then removed from the tiecoat and the resulting sheet (F) was laminated with the tiecoat onto a thermoformable backing sheet (C) having a thickness of 1200 µm and based on ASA/PC (commercial product made of Luran® S from BASF Aktiengesellschaft).

The backing sheet (T) was then removed and the transparent coating (KT1) was laminated with a commercially customary thermoformable protective film (S) (commercial product GH-X 535 from Bischof+Klein, Lengerich).

Example 2

2.1 Preparation of the UV-Curable Coating Composition (K2)

2.1.1 The Preparation of the Organic Solution of a Urethane Acrylate (Organic Solution of Component (KK2))

A urethane acrylate was prepared from the building block components set out below by coarsely dispersing the hydrogenated bisphenol A in 4-hydroxybutyl acrylate and pentaerythrityl tri/tetraacrylate at 60° C. with stirring. Added to this suspension were the isocyanates, hydroquinone monomethyl ether, 1,6-di-tert-butyl-para-cresol and butyl acetate. After dibutyltin dilaurate had been added the mixture heated up. Stirring was carried out at an internal temperature of 75° C. for a number of hours until there was virtually no longer any change in the NCO value of the reaction mixture. Any free isocyanate groups still present after the reaction were reacted by adding a small amount of methanol.

227.7 g of hydrogenated bisphenol A (corresponding to 1.89 equivalents of hydroxyl groups),
178.2 g of 4-hydroxybutyl acrylate (corresponding to 1.24 equivalents of hydroxyl groups)
701.3 g of pentaerythrityl tri/tetraacrylate (OH number=110 mg(KOH)/g, corresponding to 1.37 equivalents of hydroxyl groups)
325.69 g (corresponding to 1.71 equivalents of isocyanate groups) of Basonat® HI 100 from BASF AG=commercial isocyanurate of hexamethylene diisocyanate with an NCO content of 21.5%-22.5% (DIN EN ISO 11909),
325.69 g (corresponding to 1.74 equivalents of isocyanate groups) of Basonat® HB 100 from BASF AG=commercial biuret of hexamethylene diisocyanate with an NCO content of 22%-23% (DIN EN ISO 11909),
147.38 g (corresponding to 1.13 equivalents of isocyanate groups) of Desmodur® W from Bayer MaterialScience AG=commercial dicyclohexylmethane diisocyanate with an NCO content of ≧31.8%
0.953 g of hydroquinone monomethyl ether (0.05% on solids)
1.906 g of 1,6-di-tert-butyl-para-cresol (0.1% on solids)
816.84 g of butyl acetate (corresponds to 70% solids)
0.7624 g of dibutyltin dilaurate (0.04% on solids)
17.1 g of methanol (corresponding to 0.53 equivalent of hydroxyl groups)

The component (KK2) thus obtained has the following characteristics:
- on average 7.1 ethylenically unsaturated double bonds per molecule
- a double bond content of 2.92 mol of double bonds per 1000 g of urethane acrylate solids
- on average 1.5 branching points per molecule
- 16% by weight of cyclic structural elements, based on the solids content of the urethane acrylate.

2.1.2 The Preparation of a UV-Curable Coating Composition (K2) **

143.00 parts by weight of the above-described organic solution of the urethane acrylate (KK2) were charged to a suitable stirred vessel. Added to the initial charge over the course of 30 minutes was a mixture of 1.0 part by weight of Tinuvin® 292 (commercial HALS light stabilizer from Ciba Specialty Chemicals, based on a mixture of bis(1,2,2,6,6-pentamethyl-4-piperidinyl)sebacate and methyl(1,2,2,6,6-pentamethyl-4-piperidinyl)sebacate), 2.35 parts by weight of Tinuvin® 400 (commercial light stabilizer from Ciba Specialty Chemicals, based on a mixture of 2-(4-((2-hydroxy-3-dodecyloxypropyl)oxy)-2-hydroxyphenyl)-4,6-bis(2,4-dimethylphenyl)-1,3,5-triazine and 2-(4-((2-hydroxy-3-tridecyloxypropyl)oxy)-2-hydroxyphenyl)-4,6-bis(2,4-dimethylphenyl)-1,3,5-triazine), 0.8 part by weight of Lucirin® TPO-L (commercial photoinitiator from BASF Aktiengesellschaft, based on ethyl 2,4,6-trimethylbenzoylphenylphosphinate), 2.40 parts by weight of Irgacure® 184 (commercial photoinitiator from Ciba Specialty Chemicals, based on 1-hydroxycyclohexyl phenyl ketone), and 0.40 part by weight Byk® 325 (commercial additive from Byk Chemie, based on a polyether-modified polymethylalkylsiloxane) at room temperature with continuous stirring and adjusted with 1-methoxypropy-2-yl acetate to a solids content of 51%. The resulting mixture was subsequently stirred at room temperature for 30 minutes.

2.2. Production of the Thermoformable Sheet 2 Provided with a Coating

The sheet 2 provided with a coating was produced in the same way as for the production of the sheet 1 of example 1, with the difference that now the UV-curable coating composition (K2) was used instead of the coating composition (K1).

What is claimed is:
1. A process for producing a sheet (F) bearing a coating (B), comprising
   1. applying to an optionally pretreated surface (T1) of a backing sheet (T) a crosslinkable coating composition (K) comprising a free-radical crosslinkable component (KK),
   2. subjecting the applied coating composition (K) to at least one of drying, partially crosslinking, or drying and partially crosslinking to produce a coating (KT) which is not fully crosslinked,
   3. applying a pigmented coating composition (P) to the coating (KT) which is not fully crosslinked to produce a coating (PB), and
   4. applying a tiecoat (H) to the coating (PB) and drying the tiecoat (H),
wherein the crosslinkable coating composition (K) produces a transparent coating (KE) after crosslinking to completion, wherein the crosslinkable coating composition (K) comprising the free-radically crosslinkable component (KK) comprises
   (i) one or more oligourethane (meth)acrylates, one or more polyurethane (meth)acrylates, or one or more oligo- and polyurethane (meth)acrylates,
   (ii) a number-average molecular weight of from 1000 to 50 000 g/mol, and
   (iii) a double bond content of from 1.0 to 5.0 mol of double bonds per 1000 g of reactive component (KK),
wherein the free-radically crosslinkable component (KK) comprises
   (iv) greater than 1 branching point per molecule,
   (v) 5%-50% by weight, based on the weight of component (KK), of cyclic structural elements,
   (vi) at least one aliphatic structural element comprising at least 6 carbon atoms in the chain, and
   (vii) carbamate, biuret, allophanate, urea, amide, or a combination comprising two or more of the foregoing groups.

2. The process of claim 1, further comprising applying a thermoformable backing sheet (C), different from the backing sheet (T), to the tiecoat (H).

3. The process of claim 1, wherein applying the tiecoat (H) to the coating (PB) is by laminating an assembly comprising the tiecoat (H) and a release film (R) to the coating (PB).

4. The process of claim 1, further comprising removing the backing sheet (T) after applying the pigmented coating composition (P) to the coating (KT), or after applying the tiecoat (H) to the coating (PB).

5. The process of claim 4, further comprising applying a thermoformable protective film (S), different from the backing sheet (T), to the coating (KT) which is not fully crosslinked.

6. The process of claim 4, wherein the crosslinkable coating composition (K) is crosslinked to completion prior to injection molding, but after thermoforming and/or deep-drawing.

7. A sheet (F) bearing a coating (B), produced by
   1. applying to an optionally pretreated surface (T1) of a backing sheet (T) a crosslinkable coating composition (K) comprising a free-radical crosslinkable component (KK),
   2. drying, partially crosslinking, or drying and partially crosslinking the coating composition (K) to produce a coating (KT) which is not fully crosslinked,
   3. applying a pigmented coating composition (P) to the coating (KT) which is not fully crosslinked to produce a coating (PB) having a dry film thickness of at least 20 micrometers, and
   4. applying a tiecoat (H) to the coating (PB) and drying the tiecoat (H),
wherein the crosslinkable coating composition (K) produces a transparent coating (KE) having a dry film thickness of at least 20 micrometers after crosslinking to completion,
wherein the crosslinkable coating composition (K) comprising the free-radically crosslinkable component (KK) comprises
   (i) one or more oligourethane (meth)acrylates, one or more polyurethane (meth)acrylates, or one or more oligo- and polyurethane (meth)acrylates,
   (ii) a number-average molecular weight of from 1000 to 50 000 g/mol, and
   (iii) a double bond content of from 1.0 to 5.0 mol of double bonds per 1000 g of reactive component (KK),
wherein the free-radically crosslinkable component (KK) comprises
   (iv) greater than 1 branching point per molecule,
   (v) 5%-50% by weight, based on the weight of component (KK), of cyclic structural elements,
   (vi) at least one aliphatic structural element having at least 6 carbon atoms in the chain, and
   (vii) carbamate, biuret, allophanate, urea, amide, or a combination comprising two or more of the foregoing groups.

8. The sheet of claim 7, wherein the tiecoat (H) is disposed on the coating (PB) and further wherein a thermoformable backing sheet (C), different from the backing sheet (T), or a release film (R) is disposed on the tiecoat (H).

9. The sheet of claim 7, wherein the backing sheet (T) is removed after applying the pigmented coating composition (P) to the coating (KT), or after applying the tiecoat (H) to the coating (PB), and further wherein a thermoformable protective film (S), different from the backing sheet (T), is applied to the coating (KT) which is not fully crosslinked.

10. The sheet of claim 7, wherein the average carbamate, biuret, allophanate, urea, and amide group content of the free-radically crosslinkable component (KK) is from more than 0 to 2.0 mol per 1000 g of reactive component (KK).

11. The sheet of claim 7, wherein the free-radically crosslinkable component (KK) comprises from 2 to 20.0 double bonds per molecule, aliphatic structural elements comprising from 4 to 5 carbon atoms in the chain, or from 2 to 20.0 double bonds per molecule and aliphatic structural elements comprising from 4 to 5 carbon atoms in the chain.

12. The sheet of claim 7, wherein the backing sheet (T) has a roughness of less than 10 nm.

13. The sheet of claim 7, wherein the free-radically crosslinkable component (KK) comprises, as cyclic structural elements, monocyclic structural elements having 4 to 8 ring members, dicyclic elements having 7 to 18 ring members, tricyclic elements having 7 to 18 ring members, polycyclic elements having 7 to 18 ring members, or a combination comprising two or more of the foregoing cyclic structural elements.

14. The sheet of claim 7, wherein the free-radically crosslinkable component (KK) comprises as cyclic structural elements cycloaliphatic structural elements, heterocyclic structural elements, heterocyclic structural elements wherein the number of heteroatoms per ring is 1 to 8, heterocyclic structural elements wherein the heteroatoms are selected from nitrogen, oxygen, sulfur, and a combination comprising two or more of the foregoing heteroatoms, aromatic structural elements, or a combination comprising two or more of the foregoing cyclic structural elements, wherein the amount of aromatic structural elements is less than 10% by weight, based on the weight of component (KK).

15. The sheet of claim 14, wherein the cyclic structural elements are selected from the group consisting of tricyclodecane rings, cyclohexane rings, isocyanurate rings, triazine rings, aliphatic structural elements having 6 to 18 carbon atoms in the chain, and a combination comprising at least one of the foregoing cyclic structural units.

16. The sheet of claim 7, wherein the free-radically crosslinkable component (KK) is prepared from hexamethylene diisocyanate, isophorone diisocyanate, methylenebis(4-isocyanatocyclohexane), the corresponding isocyanurates of the foregoing isocyanates, biurets of the foregoing isocyanates, allophanates of the foregoing isocyanates, hydroxyethyl acrylate, 4-hydroxybutyl acrylate, pentaerythrityl triacrylate, isopropylidenedicyclohexanol, or a combination comprising two or more of the foregoing.

17. The sheet of claim 7, wherein the free-radically crosslinkable component (KK) comprises less than 5% by weight, based on the weight of component (KK), of detectable free isocyanate groups.

18. A molding comprising the sheet (F) of claim 7 and a polymeric material (KM).

19. The molding of claim 18, wherein the sheet (F) is laminated by the tiecoat (H) onto the polymeric material (KM).

20. The molding of claim 18, wherein the sheet (F) is thermoformed and injection-backmolded or foam-backed with the polymeric material (KM).

21. Interior or exterior bodywork components, components for shipbuilding or aircraft construction, or components for household or electrical appliances, comprising the sheet of claim 7.

22. The sheet of claim 7, wherein the cyclic structural element comprises hydrogenated bisphenol A.

23. The sheet of claim 7, wherein the pigmented coating composition (P) comprises one or more thermoplastic polymers selected form the group consisting of urethane polymers, acrylic polymers, methacrylic polymers, vinyl polymers, fluoropolymers, and mixtures comprising at least one of the foregoing thermoplastic polymers.

24. The sheet of claim 7, wherein the pigmented coating composition (P) comprises a thermally curable aqueous basecoat material.

25. The sheet of claim 7, wherein the tiecoat (H) is dried, and has a dry film thickness of 5 to 50 micrometers.

* * * * *